Jan. 31, 1967 J. G. THEODORE ETAL 3,301,689
VACUUM FIRED BERYLLIA WARE

Filed Feb. 27, 1962 5 Sheets-Sheet 1

INVENTORS.
CHESTER A. BIELAWSKI
JOHN G. THEODORE
BY John H. Leonard,
their ATTORNEY.

INVENTORS.
CHESTER A. BIELAWSKI
JOHN G. THEODORE

INVENTORS.
CHESTER A. BIELAWSKI
JOHN G. THEODORE
BY John H Leonard,
their ATTORNEY.

3,301,689
VACUUM FIRED BERYLLIA WARE

John G. Theodore, Willowick, and Chester A. Bielawski, Cleveland, Ohio, assignors to The Brush Beryllium Company, Cleveland, Ohio, a corporation of Ohio
Filed Feb. 27, 1962, Ser. No. 176,066
6 Claims. (Cl. 106—55)

This invention relates to beryllia ceramic ware having high purity and density, and particularly to a method of fabrication of beryllia ware compacts by the slip-casting technique.

Slip casting in itself seems unlikely to replace the more conventional powder metallurgical techniques of pressure compacting pulverulent materials into compacts preparatory to sintering the resultant compacts to produce beryllia ceramic ware. However, when tooling costs and complicated designs are important factors, slip casting can be used to advantage as a supplement to the conventional powder methods.

Slip casting is old and well-known to ceramists. As generally understood, it comprises pouring a liquid-solid suspension or slip of pulverulent material into a plaster of Paris mold of desired configuration. The solids in the slip progressively deposit upon the mold wall and each other due to their freedom of movement in the slip liquid and the capillary action of the liquid-absorbing mold. When the desired wall thickness has been built up, the remaining liquid-solid suspension is decanted and the formed compact is allowed to air dry. The "green" compact thus formed is then further dried and finally fired so as to increase its density, strength, and other well-known desirable physical properties.

In the last few years, ceramists have successfully adapted a method of slip casting to beryllia, as evidenced by R. F. Walker's work reported to The United Kingdom Atomic Energy Research Establishment in report number AERE–CE/R–440, entitled "Some Preliminary Work on the Manufacture and Sintering of Dense Beryllia Shapes," dated December 1949. British Letters Patent No. 665,-373, was granted January 23, 1952, based on the work by Walker and his coworker, S. G. Bauer.

The above publications disclose the use of a nonreacting atmosphere of nitrogen or argon gas containing free carbon in the sintering of beryllia compacts to densities in excess of 2.86 g./cc., which is 95% of the theoretical maximum density of 3.008 g./cc. for beryllia. Further, they teach a method of preparing the beryllia powder for slip-casting purposes.

According to this method, a ball mill drum is filled with approximately ⅓ steel balls and ⅓ beryllia powder which has been calcined at 1400° C. for one hour prior to being charged into the mill, and the contents dry milled for 100 hours. This method induces contamination of a high order into the beryllia powder and, regardless of the leaching treatment used afterwards, such contamination cannot be completely removed. Indeed, the choice of grinding time and grinding medium used therein appear quite arbitrary, apparently no attempt being made to determine the final particle size of the influence thereof, or of the induced contamination, or different grinding times, on the final product. Regardless of the specific method therein disclosed, the publications point out that, in preparing the slip, some of the main factors to be considered are: (1) particle size of the ground pulverulent material, (2) the use of deflocculants and the relative proportions of beryllia and the deflocculant selected, (3) the pH of the slip, and (4) the age of the slip. Indeed, the proportions of pulverulent material and deflocculant, along with the hydrogen ion concentration, are extremely pertinent. We have discovered that, as disclosed hereinafter, by properly controlling these variables, greater reliability and consistent reproducibility and better quality compacts and ceramic beryllia wares can be obtained.

Investigations by other ceramists on different material have shown that broadly one of the most decisive factors for making a castable slip is the relationship of the hydrogen ion concentration and the viscosity of the liquid medium. Such a relationship is closely connected to the physical properties of the final product. For example, a high degree of reliability in producing slip-cast ware cannot be attained by merely allowing a slip to "stand overnight" to achieve a "creamy consistency with slightly gelatinous properties." Further, casting an aged slip without making a final adjustment of the hydrogen ion concentration is to ignore the chemical reaction that takes place between the fluid medium and the surfaces of the particles in suspension and the resultant change in pH.

Another important factor in slip casting is the ratio of the quantity of the liquid medium to the ceramic component. By decreasing the liquid content, the viscosity and specific gravity of the slip at the desired pH level may be regulated, thereby controlling not only the rates of both casting and shrinkage-upon-drying, as distinguished from shrinkage-upon-firing, but also the density of the final sintered product.

By controlling the viscosity, amount of deflocculating agent used, and specific gravity of the slip, the stability of the slip, its casting rate, mold reaction and shrinkage rate are controlled so that a reliable and economical method of forming beryllia ware of consistent quality and commercially acceptable reproducibility is attained.

Other objects of this invention are to provide an improved method of slip casting beryllia ware, to provide a fired beryllia slip-cast compact of high purity and density, to provide a reliable and consistently reproducible beryllia slip capable of being fired, after slip casting, to densities in excess of approximately 95 percent of the theoretical maximum density of the metal oxide and to a purity level in excess of 99 percent pure.

Another object is to provide a beryllia slip which is capable of being first aged and then fired after casting to provide densities in excess of approximately 95 percent of the theoretical maximum density.

A further object is to provide beryllia slip of low viscosity and relatively low specific gravity having good and consistent castability characteristics.

Still another object is to provide a beryllia slip that remains stable during aging and prior to casting and final adjustment for industrial usage.

Specific, but extremely important, objects are to provide beryllia slip (a) containing particles of which 85 percent are less than 4 microns and of which 100 percent are less than 20 microns; (b) having a specific gravity of less than 1.50 and a hydrogen ion concentration of from about 2.5 to about 7; and (c) having a viscosity of less than approximately 20 centipoises.

Other objects and advantages will become apparent from the following detailed description and explanation of the invention wherein reference is made to the drawings in which.

In accordance with the present invention, various types of input beryllia powder are utilized to develop slips from which sound ware can be cast and vacuum fired to densities in excess of approximately 95 percent of the theoretical maximum density of 3.008 g./cc. Powders found satisfactory are high purity beryllia powder. By various types is meant (1) as-received commercial beryllia powder, (2) air and vacuum recalcined beryllia powder, (3) scrap powder produced from a 815° C. air bisque-firing of extruded or cold pressed beryllia compacts, (4) high fired, finish processed scrap beryllia powder, and (5) mechanically cold worked beryllia powder. These beryllia powders have a total foreign elemental impurity level of approximately 400 p.p.m., the impurities being silicates, heavy metals, alkalis, and alkaline earths.

Prior to any further operation, the powder is crushed or regranulated to −20 mesh or less.

In order to produce high quality, consistently producible beryllia ware, a ball milling operation is necessary because the densification of a vacuum fired slip cast article is dependent, in part, upon the degree of comminution incurred in the milling operation. Such an operation, though, induces contamination into the system. The amount of induced contamination is dependent upon the abrasion between the mill lining and grinding medium. In a dry milling operation, the comminution efficiency is decreased as a result of the "caking" of the powder on the mill linings and surfaces of the grinding medium. Consequently, prolonged dry milling is required to obtain the degree of fineness necessary, as will be hereinafter disclosed. But prolonged dry milling decreases the purity level of the final product. Therefore, to obtain the degree of fineness necessary while maintaining the degree of induced contamination at a minimum, a wet ball milling operation is preferred.

Rubber-lined mills should not be employed because, during the milling operation, foamed slurries containing abraded rubber particles are formulated.

To further limit or reduce the amount of induced contamination, beryllia or alumina bodies are used as the grinding medium instead of the steel balls commonly used in ball milling. Although beryllia grinding bodies are preferred from the standpoint of contamination, on the same volume loading basis alumina bodies are more effective for comminution due to the higher density of alumina as compared to beryllia. The alumina is a high fired, "dead burn" material, and consequently the amount of induced contamination is in a non-reactive form.

Figure 1:
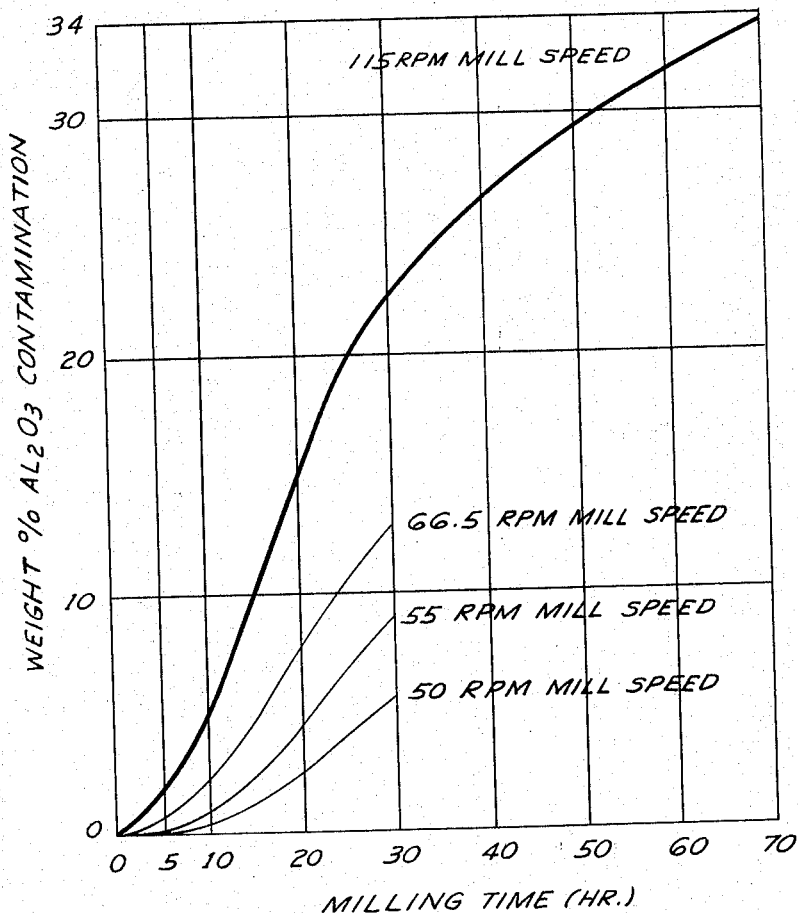
FIGURE 1 is a graph showing a series of relationships of wet ball milling time to induced alumina contamination.
Figure 2:
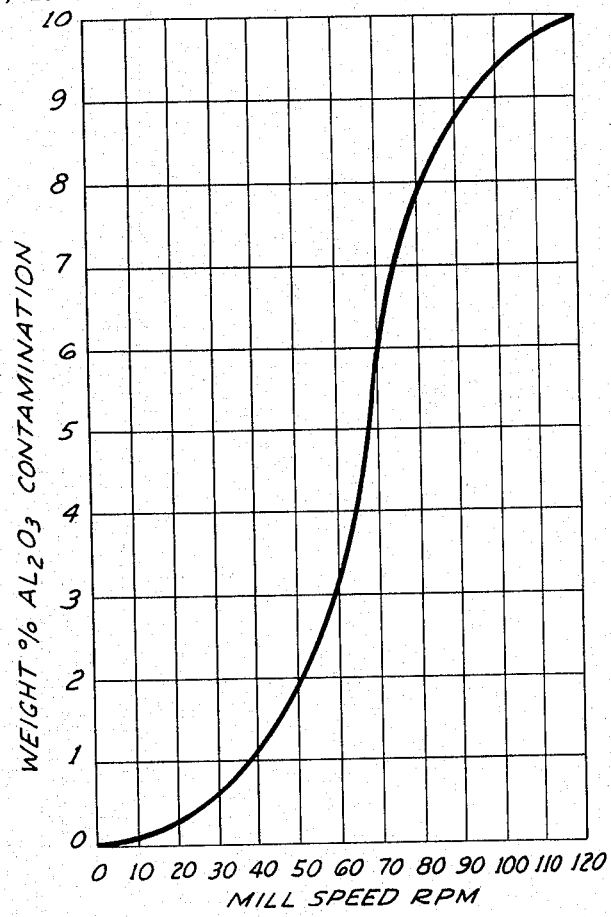
FIGURE 2 is a graph showing the effects of ball mill rotational speed upon induced alumina contamination.
Figure 3:
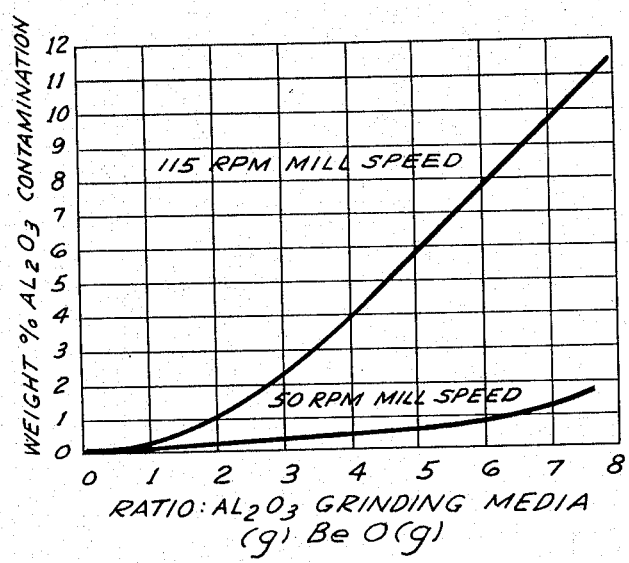
FIGURE 3 is a graph illustrating the relation of increased loading of alumina grinding medium and the resulting percent of alumina contamination.

Control of the alumina contamination can be readily achieved by increasing the amount of beryllia charged into the mill, by controlling the rotational speed of the mill and the duration of the milling time or cycle, as is evidenced by FIGURES 1, 2, and 3.

With reference to FIGURE 1, a relationship between wet ball milling time and induced alumina contamination is shown wherein the abscissa is the milling time in hours and the ordinate is the weight precent of alumina contamination. As indicated, the amount of contamination increases with both increased milling speed and increased milling time.

FIGURE 2 shows the effects of increased rotational speed on induced contamination for a constant charge volume having a ratio of grinding medium to powder of approximately 8:1 and a constant milling time of 16 hours. Therein the abscissa is the milling speed in revolutions per minute and the ordinate is the weight percent of alumina contamination.

As to the effects of increased loading of alumina grinding balls upon the weight percent of alumina induced contamination, FIGURE 3 indicates that when varied milling speeds are used, and further, that when the ratio of grinding medium to powder is decreased, the amount of contamination is decreased accordingly. Thus, the maximum grinding efficiency consistent with the lowest amount of induced mill contamination may be obtained by controlling the above mentioned variables.

Preferably, from 50 to 55 percent of the mill volume is occupied by the alumina grinding bodies and from 35 to 40 percent by a powder slurry consisting of 1.5 parts of distilled water to 1 part powder, by weight.

The rotational speed of the mill is preferably 55 to 60 revolutions per minute and the milling time approximately 16 hours, dependent upon the type of input powder employed. As mentioned hereinabove, the degree of comminution is pertinent to the extent that it determines the amount of deflocculant to be used in order to prevent the settling of the pulverulent materials. This, in turn, has an effect upon the pH factor, which is one of the factors which affects the properties of the end product. Further, as is known, the particle size has an effect upon the rate of shrinkage-during-drying and upon shrinkage-during-firing.

Figure 4:
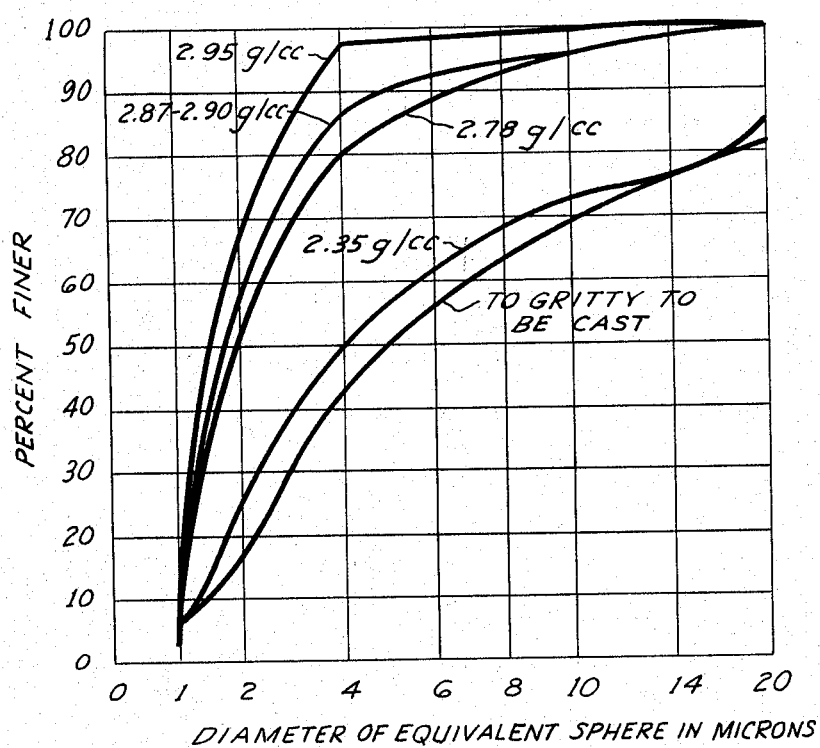
FIGURE 4 is a graph illustrating various effects of particle size distribution of beryllia upon the sinterability of slip cast ware fired at 1750° C.±10° C. for 3 hours.

FIGURE 4 shows that the densification of vacuum fired slip cast articles, such as crucibles, is dependent upon the beryllia particle size, and hence upon the degree of reduction of particle size of the input beryllia in a comminution operation. Thus, in order to produce a beryllia ware having a fired density in excess of approximately 95 percent of theoretical, the beryllia slip must contain an excess of approximately 85 percent of powder particles whose diameter of equivalent sphere is equal to, or less than, 4 microns, and 100 percent less than 20 microns.

Since the pH factor and also the viscosity affect the properties of the end product, the liquid-to-solid ratio and amount of deflocculant used must be controlled in order to produce a useful and castable slip.

Figure 5:
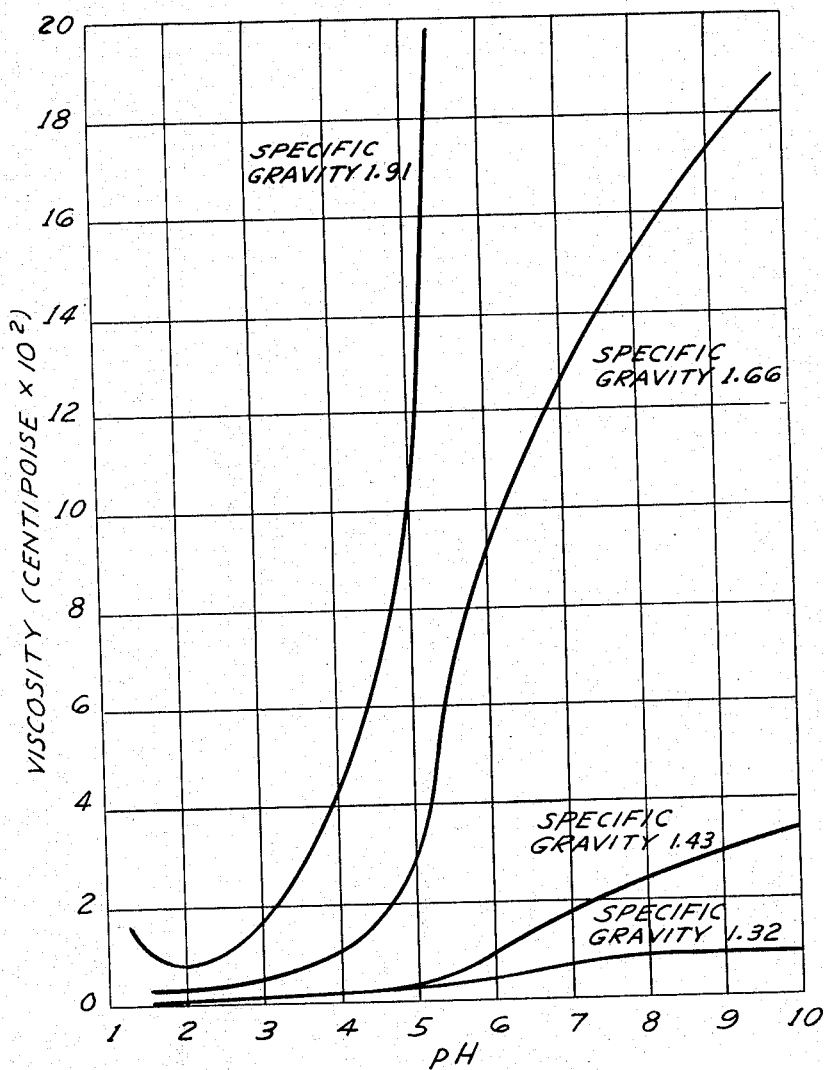
FIGURE 5 is a graph illustrating a series of relationships of viscosity and pH as a function of specific gravity.

FIGURE 5 shows the correlation of viscosity and pH as a function of specific gravity, wherein the viscosity in centipoise is the ordinate and the pH factor is the abscissa. This figure shows the very important factor that when 70 to 75 percent beryllia is in suspension, indicating a specific gravity of approximately 1.8 to 2.0, the slip is extremely viscous as compared to a slip having a low specific gravity. Such a high specific gravity has a prohibitively high casting rate and high shrinkage-during-drying rate. Common phenomena of viscous slip are warpage and cracking upon firing. Thus, a lower viscosity slip is highly desirable.

In addition, a slip having too rapid a settling rate of its particles tends to form a compact of uneven wall thickness, and further, tends to induce the entrapment of air within the cast compact.

It is evident from FIGURE 5 that, as the specific gravity is increased from 1.32 to 1.91, resulting in increased viscosity, the pH for sufficient deflocculation necessary to produce an economical castable slip, shifts from approximately 4.5 to approximately 2.0. This high hydrogen ion concentration results in a high corrosion rate of the plaster molds and is undesirable because rapid deterioration of such molds is highly uneconomical.

Figure 6:
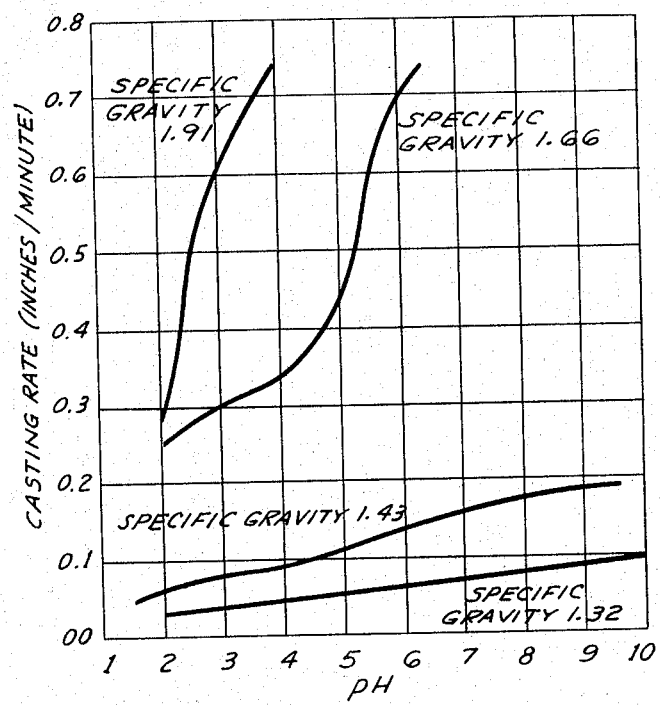
FIGURE 6 is a graph illustrating the casting rate and pH as a function of specific gravity.

In addition to the corrosion effect, a slip exhibiting a high specific gravity will have, as mentioned above, a much higher casting rate; as can be seen by referring to FIGURE 6 wherein the casting rate in inches per minute is the ordinate and the pH factor is the abscissa. The family of specific gravity curves shows that as the pH increases from 2 to 4, the casting rate more than doubles for a slip having a specific gravity of 1.91.

Figure 7:
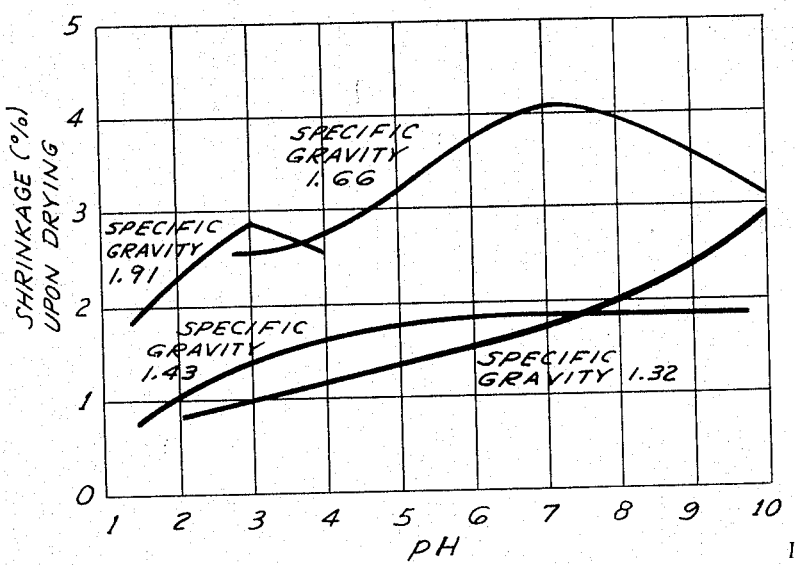
FIGURE 7 is a graph illustrating the shrinkage-upon-drying rate of slip-cast beryllia as a function of pH and specific gravity.

Referring to FIGURE 7, it is to be noted that a slip having a high specific gravity also has a much higher shrinkage-upon-drying rate. Here a series of curves shows the correlation of shrinkage in percent to the pH factor, in relation to changes in specific gravity.

It can be seen from the above, that the specific gravity of the slip is highly important and must be considered in order to be able to provide an economical and reliable slip casting technique and method of consistently producing commercially acceptable beryllia ware.

Once the preferred milling operation has proceeded for the nominal indicated time, sufficient 2 N hydrochloric acid is added to make the milled slurry pourable. This slurry is then discharged into a rust-proof container. The specific gravity of the slurry is then adjusted to a selected low solid-to-liquid ratio, for example, from about 1.17 to about 1.50, and the hydrogen ion concentration is adjusted by the addition of 2 N hydrochloric acid to a preferred pH of 4.0±0.2. After allowing the prepared slip to age for about 48 hours, the slip is then brought up to a pH of 4.0±0.2 by the addition of hydrochloric acid.

Realizing that slip stability is an important factor to be considered for the industrial usage of this technique, several beryllia slips were prepared by the wet ball milling operation, hereinbefore mentioned, and deflocculated with 2 N hydrochloric acid to an approximate pH of 4. At intervals of 8 to 24 hours, redeterminations were made of the pH, viscosity, and specific gravity. At the conclusion of the aging cycle, which in some instances was approximately 350 hours, the pH of each slip was readjusted to 4. The slips were then cast and fired and their properties compared. From the results, it become apparent that aging of beryllia slips is an effective means of achieving greater reproducibility in quality and properties of slip cast beryllia ware.

After the pH of the slip is readjusted, the slip is poured into a plaster of Paris mold, such as disclosed in our copending application entitled "Air Fired Beryllia Ware," Serial No. 176,125, filed February 27, 1962, now Patent No. 3,196,023. In pouring, care should be exercised in order to prevent the formation of air bubbles in the slip. A constant fill of the mold volume, as is common, should also be maintained. After allowing sufficient time for the deposition of the desired wall thickness, the excess slip is drained off. The casting is then dried within the mold for about 8 hours at ambient room temperature, followed by a heat treatment in the mold, if desired, at a temperature of approximately 50° C. for a time sufficient to complete the drying operation. The green cast compact is then removed from the mold. Although the green strength of the compact is sufficient for handling purposes, improved handling may readily be achieved by spraying the ware lightly with an aqueous solution of 6 weight percent beryllium sulfate. Such a thin surface deposition will not induce contamination or affect the fired properties.

To remove the total organic content of the slip compact prior to vacuum firing, a preliminary heat treatment, termed "bisque-firing," may be performed in air. This prefiring is preferably conducted at 800° C. for three hours, although other temperatures below the sintering temperature of beryllia may be utilized. Bisque firing at 1300° C. to 1500° C. causes presintering, which reduces the densification of the final product and should therefore be avoided. The preferred prefiring temperature is between 800–1000° C. Normal furnace cooling may be employed.

The preferred compact is then placed in a vacuum furnace, such as a molybdenum resistance wire wound induction furnace, in which a vacuum of 1 micron or less of mercury is then created and maintained throughout the firing cycle.

For the firing cycle, a maximum heat-up rate of 300° C. per hour from ambient room temperature to 1550° C. is employed. This is followed by a reduced heat-up rate of approximately 50° C. per hour until the preferred sintering temperature of 1750°±10° C. is reached. The use of a reduced heat-up rate is a common practice in the ceramic field and is utilized for approaching the sintering temperature gradually, i.e., the graphical curve of the heat-up temperature approaches the graphical curve of the sintering temperature tangentially. Upon the sintering temperature being reached, a soaking period is commenced during which the temperature is maintained at approximately 1750° C. until the desired densification is reached. It should be noted that a sintering temperature of approximately 1650° C. may also be used, but the length of time at this lower temperature will increase the soaking time in order to achieve the same preferred densification. The length of time necessary at a given temperature of course is further dependent upon the furnace load. Normal furnace cooling may be used.

Other sintering atmospheres for densifying high purity

TABLE I.—PARAMETERS OF DEVELOPED SLIPS AND CAST WARE PROCESSED FROM "AS RECEIVED POWDERED" AND "RECALCINED POWDER"

| Ex. No. | Type of Beryllia Powder | Wet Milling Cycle | | Milled Slurry Parameters | | | Type and Amount of Deflocculant (Wt. Percent) |
|---|---|---|---|---|---|---|---|
| | | Grinding Media | Hrs. | pH | Visc. (cps.) | Sp. Gr. | |
| 1 | As Received, Vac. Calcined 3 Hrs. at 1,650° C.; −20 Mesh Granulated. | | 16 | 8.23 | 1,610 | 1.34 | 2 N HCl, 0.6. |
| 2 | As Received, Vac. Calcined 3 Hrs. at 1,575° C.; −2 Mesh Granulated. | | 16 | 8.20 | 1,650 | 1.32 | 2 N HCl, 0.5. |
| 3 | do | | 16 | 8.40 | 2,000 | 1.34 | 2 N HCl, 0.8. |
| 4 | As Received | BeO | 16 | 7.7 | 1,760 | 1.17 | 2 N HCl, 1.00. |
| 5 | do | $Al_2O_3$ | 8 | 8.28 | 900 | 1.27 | 2 N HCl. |
| 6 | As Received, Air Calcined 3 Hrs. at 1,150° C. | BeO | 16 | 7.70 | 1,550 | 1.18 | 2 N HCl, 0.8. |
| 7 | As Received, Air Calcined 6 Hrs. at 1,150° C. | BeO | 16 | 9.30 | 1,090 | 1.21 | 2 N HCl, 1.0. |
| 8 | As Received, Air Calcined 12 Hrs. at 1,150° C. | BeO | 16 | 9.13 | 2,050 | 1.25 | 2 N HCl, 1.0. |
| 9 | As Received, Air Calcined 1 Hr. at 1,500° C. | $Al_2O_3$ | 24 | 8.50 | 3,000 | (1) | 2 N HCl, 3.0. |
| 10 | As Received, Air Calcined 3 Hrs. at 1,650° C. | $Al_2O_3$ | 24 | 9.00 | 220 | | 2 N HCl, 2.0. |
| 11 | As Received, Air Calcined 3 Hrs. at 1,500° C. | $Al_2O_3$ | 24 | 8.50 | 3,000 | | 2 N HCl, 1.9. |
| 12 | do | BeO | 16 | 8.55 | 2,360 | 1.34 | 2 N HCl, 1.4. |
| 13 | As Received, Air Calcined 3 Hrs. at 1,575° C. | BeO | 16 | 8.40 | 2,000 | 1.34 | 2 N HCl. |
| 14 | do | BeO | 16 | 8.80 | 2,880 | 1.40 | 2 N HCl. |
| 15 | As Received, Air Calcined 3 Hrs. at 1,600° C. | $Al_2O_3$ | 24 | 8.50 | 4,000 | | 2 N HCl, 2.3. |
| 16 | As Received, Air Calcined 3 Hrs. at 1,750° C. | $Al_2O_3$ | 24 | 9.60 | 1,800 | | 2 N HCl, 2.4. |

[1] Sludgy.

TABLE I.—Continued

| Ex. No. | Developed Slip Parameters | | | Vacuum Fired 3 Hrs. at 1,750° C. ±10° C. | | |
| --- | --- | --- | --- | --- | --- | --- |
| | pH | Visc. (cps.) | Sp. Gr. | Shrinkage (Percent Total) | Density | |
| | | | | | g./cc. | Percent Theoretical |
| 1 | 4.0 | 118 | 1.45 | 27.0 | 2.96 | 98.5 |
| 2 | 3.9 | 8 | 1.29 | 20.0 | 2.85 | 94.8 |
| 3 | 3.9 | 5 | 1.37 | 19.2 | 2.90 | 96.5 |
| 4 | 3.92 | 14 | 1.17 | 25.5 | 2.95 | 98.1 |
| 5 | 4.23 | 5 | 1.22 | 29.3 | 2.95 | 98.1 |
| 6 | 4.02 | 8 | 1.18 | 30.3 | 2.93 | 97.5 |
| 7 | 3.98 | 5 | 1.21 | 24.7 | 2.93 | 97.5 |
| 8 | 4.00 | 6 | 1.25 | 24.4 | 2.97 | 98.8 |
| 9 | 4.65 | 6 | 1.33 | 23.0 | 2.88 | 95.8 |
| 10 | 4.65 | 5 | 1.32 | 15.3 | 2.86 | 95.1 |
| 11 | 4.16 | 6 | 1.31 | 23.8 | 2.92 | 97.0 |
| 12 | 4.00 | 8 | 1.34 | 19.9 | 2.89 | 96.0 |
| 13 | 3.88 | 5 | 1.37 | 19.2 | 2.90 | 96.5 |
| 14 | 4.22 | 9 | 1.38 | 23.0 | 2.88 | 95.8 |
| 15 | 3.80 | 6 | 1.30 | 22.3 | 2.91 | 96.8 |
| 16 | 4.65 | 4 | 1.32 | 16.7 | 2.96 | 98.5 |

NOTE:
Visc. Denotes Viscosity and is measured in centipoise.
Sp. Gr. Denotes Specific Gravity.
Vac. Denotes Vacuum.

beryllia slip-cast ware to densities in excess of 95 percent of theoretical may be used. An example is a vacuum-hydrogen, nonreacting atmosphere wherein the hydrogen is introduced into the system at the beginning of the soaking period and maintained throughout the soaking and cooling periods.

To establish an atmosphere predominantly of carbon monoxide, the slip-cast compact may be fired within a graphite container which also serves as the susceptor in a high frequency induction furnace.

Referring to the factors and variables of the developed slip, the examples in Tables I, II, and III will best illustrate the invention herein disclosed for beryllia ware, such as crucibles, boats, tubes, etc., having a high density and purity, wherein:

Table I shows certain variables of developed slips and cast ware processed from "as received powder" and recalcined powder;

Table II shows the effects of aging and redeflocculation upon the properties of berillia slips; and Table III shows the effects of the utilization of beryllia scrap as the input material.

TABLE II.—EFFECTS OF AGING AND RE-DEFLOCCULATION UPON THE PROPERTIES OF BERYLLIA SLIPS (INPUT BERYLLIA VACUUM CALCINED 3 HRS. AT 1,575° C.)

| Example No. | Wet Ball, Milling Time (Hrs.) | Milled Slurry Parameters | | | Deflocculant | Developed Slip Parameters | | | Casting Rate (in./min.) |
| --- | --- | --- | --- | --- | --- | --- | --- | --- | --- |
| | | pH | Viscosity | Sp. Gr. | | pH | Viscosity | Sp. Gr. | |
| 17 | 16 | 7.40 | 1,000 | 1.33 | 2 N HCl | 3.68 | 6 | 1.35 | 0.082 |
| 18 | 16 | 8.40 | 2,000 | 1.34 | 2 N HCl | 3.65 | 2 | 1.37 | 0.107 |
| 19 | 16 | 8.80 | 2,880 | 1.40 | 2 N HCl | 4.00 | 11 | 1.40 | 0.130 |

| Example No. | Aging Time (Hrs.) | Re-deflocculant | Aged Slip Parameters | | | Casting Rate (in. min.) | Fired* Parameters | | |
| --- | --- | --- | --- | --- | --- | --- | --- | --- | --- |
| | | | pH | Viscosity | Sp. Gr. | | Shrinkage (Percent Total) | Density | |
| | | | | | | | | g./cc. | Percent Theor. |
| 17 | ~72 | 1:1 HCl | 4.20 | 7 | 1.37 | 0.023 | 17.9 | 2.87 | 95.5 |
| 18 | ~72 | 1:1 HCl | 3.88 | 5 | 1.37 | 0.030 | 19.3 | 2.90 | 96.5 |
| 19 | ~72 | 1:1 HCl | 4.22 | 9 | 1.38 | 0.043 | 23.0 | 2.88 | 95.8 |

*Vacuum fired 3 hrs. at 1,750° C. ±10°C.
Theor. denotes theoretical.
Sp. Gr. denotes specific gravity.
Viscosity in centipoise.

TABLE III.—EFFECTS OF THE UTILIZATION OF FABRICATED BERYLLIA SCRAP AS INPUT MATERIAL

| Ex. No. | Starting Material | Wet Milling Cycle | | Milled Slurry Parameters | | | Type and Amount of Deflocculant (Wt. Percent) |
| --- | --- | --- | --- | --- | --- | --- | --- |
| | | Grinding Media | Time (Hrs.) | pH | Viscosity | Sp. Gr. | |
| 20 | Cold Pressed, 1,500° C. Air-Fired Beryllia Pellets. | Al₂O₃ | 48 | 7.0 | 422 | 7.00 | K, 0.1; P, 0.6. |
| 21 | Beryllia Cast Bodies, 1,650° C. Vacuum Fired. | Al₂O₃ | 67 | 8.5 | 5,000 | | K+P, 0.1+0.6; 2 N HCl+H₂O. |
| 22 | Beryllia Cast Bodies, 1,500° C. Air Fired. | Al₂O₃ | 24 | 5.4 | 682 | 1.51 | K+P, 0.1+0.6. ² |
| 23 | Green Beryllia Castings, 1,500° C. Air Fired. | Al₂O₃ | 24 | 7.5 | 630 | 1.46 | K+P, 0.1+0.6 |
| 24 | Regranulated, Cold-Pressed Beryllia Bodies Containing 1% Magnesia. | Al₂O₃ | 24 | 9.0 | 500 | 1.45 | K+P, 0.1+0.6; 2 N HCl+H₂O. ² |
| 25 | Cold Pressed Beryllia Bodies Containing 1% Magnesia, Vacuum Fired. | None | 120 | 11.0 | 2,500 | Paste | 2 N HCl, 3.5. |

TABLE III.—Continued

| Exam. No. | Developed Slip Parameters | | | Casting Rate (in./min.) | Fired [1] Density | | Remarks |
|---|---|---|---|---|---|---|---|
| | pH | Visc. | Sp. Gr. | | g./cc. | Percent Theor. | |
| 20 | 6.0 | 66 | 1.41 | 0.20 | 2.94 | 97.8 | |
| 21 | 7.5 | 3,000 | 1.52 | | | | Sludgy. |
| | 5.5 | 54 | 1.36 | 0.10 | 2.97 | 98.8 | |
| 22 | 5.5 | 18 | 1.38 | 0.04 | 2.95 | 98.0 | |
| 23 | 7.0 | 17 | 1.40 | 0.06 | 2.88 | 95.8 | |
| 24 | 8.5 | 15 | 1.37 | | | | Aged 3 days. |
| | 4.0 | 62 | 1.32 | 0.40 | 2.95 | 98.0 | |
| 25 | 2.6 | 63 | 1.41 | 0.01 | 2.85 | 94.8 | |

[1] Vacuum Fired 1 Hr. at 1750° C ±10° C.
K denotes a suspending agent.
P denotes Polyvinyl Alcohol.
[2] HCl and $H_2O$ added to induce indicated pH and specific gravity levels.
Viscosity in Centipoise.
Sp. Gr. denotes specific gravity.

Thus, by controlling the size of the particles in the casting slip, along with pH, the viscosity, and the specific gravity, slip cast beryllia compacts having a purity in excess of about 99 percent and having a density in excess of approximately 95 percent of theoretical may be reliably and consistently reproduced in accordance with customer specifications.

Further, by the present method, leaching to remove iron from the beryllia powder is eliminated. Aside from the tabulated examples, it is preferable that the slip have a specific gravity of less than about 1.50 down to a specific gravity almost to that at which casting ceases to be feasible because of the prolonged suspension of the beryllia. At the same time it should have a viscosity of less than 200 centipoises, and preferably less than 20 centipoises.

The results of using such a slip are greatly improved over those obtained with prior slips of high specific gravity and viscosity.

While several examples have been herein disclosed, it is obvious that various changes can be made without departing from the spirit and scope of the invention as set forth in the appended claims. Further, it is to be understood that all matter hereinbefore set forth is to be interpreted as illustrative and not in a limiting sense.

Having thus described our invention, we claim:

1. A castable firable beryllia slip having a high purity and capable of being sintered under vacuum to a density in excess of approximately 95 percent theoretical density, characterized in that the slip consists essentially of water and high-purity beryllia particles 85 percent of which are less than 4 microns in size and 100 percent of which are less than 20 microns in size, said slip has a pH of approximately from 2.5 to 7, a specific gravity of from about 1.5 to a minimum specific gravity at which the slip is castable, and a viscosity of less than 200 centipoises but sufficient for slip castings.

2. A firable beryllia castable slip according to claim 1 wherein the specific gravity is from about 1.5 to about 1.17 and the viscosity is less than 20 centipoises, but sufficient for slip casting.

3. A firable beryllia castable slip according to claim 2 wherein the specific gravity is about 1.32.

4. A method of producing high purity beryllia bodies of densities in excess of 2.85 grams per cubic centimeter, and comprising milling beryllia of substantial purity to produce beryllia powder having particle sizes of which substantially 85 percent are less than 4 microns, and of which 100 percent are less than 20 microns, forming a castable slip consisting essentially of the milled beryllia powder and water, which slip is characterized by having a specific gravity from about 1.5 to a minimum specific gravity at which the slip is castable, a pH from approximately 2.5 to 7.0, and a viscosity of less than 200 centipoises, slip casting the slip into a green compact of predetermined shape, drying the compact and then firing the dried green compact under vacuum at a temperature of from about 1650° C. to about 1750° C.

5. A method in accordance with claim 4 wherein the castable slip has a viscosity of less than 20 centipoises.

6. A method in accordance with claim 5 wherein the castable slip has a specific gravity of from about 1.5 to about 1.17.

References Cited by the Examiner

FOREIGN PATENTS 665,373   1/1952   Great Britain.

OTHER REFERENCES

J. American Ceramic Soc., vol. 30, 1947, pp. 242–45.

J. Research, Natl. Bur. Standards, 23(2) (1939) R.P. 1236.

TOBIAS E. LEVOW, *Primary Examiner.*

J. E. POER, *Examiner.*